US012650739B2

(12) United States Patent
Griffith et al.

(10) Patent No.: US 12,650,739 B2
(45) Date of Patent: Jun. 9, 2026

(54) DATA ITEM SHARING VIA POINTING DEVICE

(71) Applicant: Dell Products L.P., Round Rock, TX (US)

(72) Inventors: Jimmy L. Griffith, Pflugerville, TX (US); Kai Wang, Shanghai (CN); David Allen Dyson, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/928,376

(22) Filed: Oct. 28, 2024

(65) Prior Publication Data

US 2026/0118982 A1 Apr. 30, 2026

(51) Int. Cl.
| | |
|---|---|
| *G06F 3/038* | (2013.01) |
| *A63F 13/31* | (2014.01) |
| *G06F 3/0354* | (2013.01) |
| *G06F 3/04842* | (2022.01) |
| *G06F 3/0487* | (2013.01) |

(52) U.S. Cl.
CPC .............. *G06F 3/038* (2013.01); *A63F 13/31* (2014.09); *G06F 3/03543* (2013.01); *G06F 3/04842* (2013.01); *G06F 3/0487* (2013.01); *G06F 3/03545* (2013.01); *G06F 2203/0384* (2013.01)

(58) Field of Classification Search
CPC .. G06F 3/038; G06F 3/03543; G06F 3/04842; G06F 3/0487; G06F 3/03545; G06F 2203/0384; A63F 13/31
See application file for complete search history.

(56) References Cited

U.S. PATENT DOCUMENTS

| | | | | |
|---|---|---|---|---|
| 7,599,562 B2 * | 10/2009 | Liu | ..................... | G06F 3/03545 382/314 |
| 2006/0250360 A1 * | 11/2006 | Goodwin | .............. | G06F 3/0383 345/163 |
| 2007/0289021 A1 * | 12/2007 | Xavier | .................... | G06F 21/10 726/26 |
| 2008/0320543 A1 * | 12/2008 | Wang | ................. | H04N 21/4122 725/131 |

(Continued)

OTHER PUBLICATIONS

Intel® Unison™ Application, "Connect Your PC and Devices Seamlessly with Intel Unison App," downloaded Sep. 23, 2024, publisher Intel Corporation, available at https://www.intel.com/content/www/us/en/products/docs/unison/overview.html.

(Continued)

*Primary Examiner* — Ariel A Balaoing
(74) *Attorney, Agent, or Firm* — Fogarty LLP

(57) ABSTRACT

A pointing device, such as a mouse, a touchpad, or an active pen, may include functionality that allows the pointing device to receive a data item from a first information handling system (IHS), such as by storing the data item to a memory of the pointing device, and to transfer the data item to a second IHS. The pointing device may include a near field communication (NFC) device having a memory. The pointing device may include RAM that is separate from an NFC device. The pointing device may receive the data item via NFC or other wireless communication protocol and may transfer the data item to the second IHS either via NFC or other wireless communication protocol.

20 Claims, 7 Drawing Sheets

(56) References Cited

U.S. PATENT DOCUMENTS

| 2012/0154279 A1* | 6/2012 | Yang | G06F 3/03543 |
| | | | 345/163 |
| 2013/0050101 A1* | 2/2013 | Lu | G06F 3/038 |
| | | | 345/173 |
| 2013/0267172 A1* | 10/2013 | Ko | H04L 67/561 |
| | | | 455/41.1 |
| 2014/0095659 A1* | 4/2014 | Won | H04L 67/06 |
| | | | 709/217 |
| 2015/0355734 A1* | 12/2015 | Lo | G06F 3/0383 |
| | | | 345/179 |
| 2016/0018990 A1* | 1/2016 | Yun | G06F 3/0655 |
| | | | 711/170 |
| 2016/0065726 A1* | 3/2016 | Kuznetsov | G06F 3/04842 |
| | | | 455/414.1 |
| 2022/0308683 A1* | 9/2022 | Li | G06F 3/016 |
| 2024/0264739 A1 | 8/2024 | Wang | |

OTHER PUBLICATIONS

"Logitech Flow," downloaded Sep. 23, 2024, publisher Logitech, available at https://support.logi.com/hc/en-za/articles/360023188134-Logitech-Flow.

"All Systems Flow," Logitech Flow Multi-Device Control and Easy File Sharing, downloaded Sep. 23, 2024, publisher Logitech, available at https://www.logitech.com/en-us/software/features/flow.html?srsltid=AfmBOope4o3wiPMUy7M3jgRGLQRH9uV-Vsn_11ePXsAhxeaUK6PnlMun.

"Mouse Without Borders Setup/User Guide, Tips, Tricks, and FAQs," downloaded Sep. 23, 2024, publisher Microsoft, available at https://answers.microsoft.com/en-us/windows/forum/all/mouse-without-borders-setupuser-guide-tips-tricks/0523308d-3406-4273-b86e-bef28aa6b50d.

"Sync Firefox data," downloaded Sep. 23, 2024, publisher Firefox, https://support.mozilla.org/en-us/kb/sync, available at https://support.mozilla.org/en-US/kb/sync.

"Use Continuity to work across Apple devices—Apple Support," Mac User Guide, downloaded Sep. 23, 2024, publisher Apple Inc., available at https://support.apple.com/guide/mac-help/intro-to-continuity-mchl1d734309/mac#:~:text=Continuity is the way that,Account on your Apple devices.

"Use Handoff to continue tasks on yourother devices," downloaded Sep. 23, 2024, publisher Apple Inc., available at https://support.apple.com/en-us/102426.

"Easier to sync your PCand phone," downloaded Sep. 23, 2024, publisher Microsoft, available at https://www.microsoft.com/en-us/windows/sync-across-your-devices.

"What is Dell Pair?," downloaded Sep. 23, 2024, publisher Dell Technologies, available at https://www.dell.com/support/kbdoc/en-us/000201693/what-is-dell-pair.

* cited by examiner

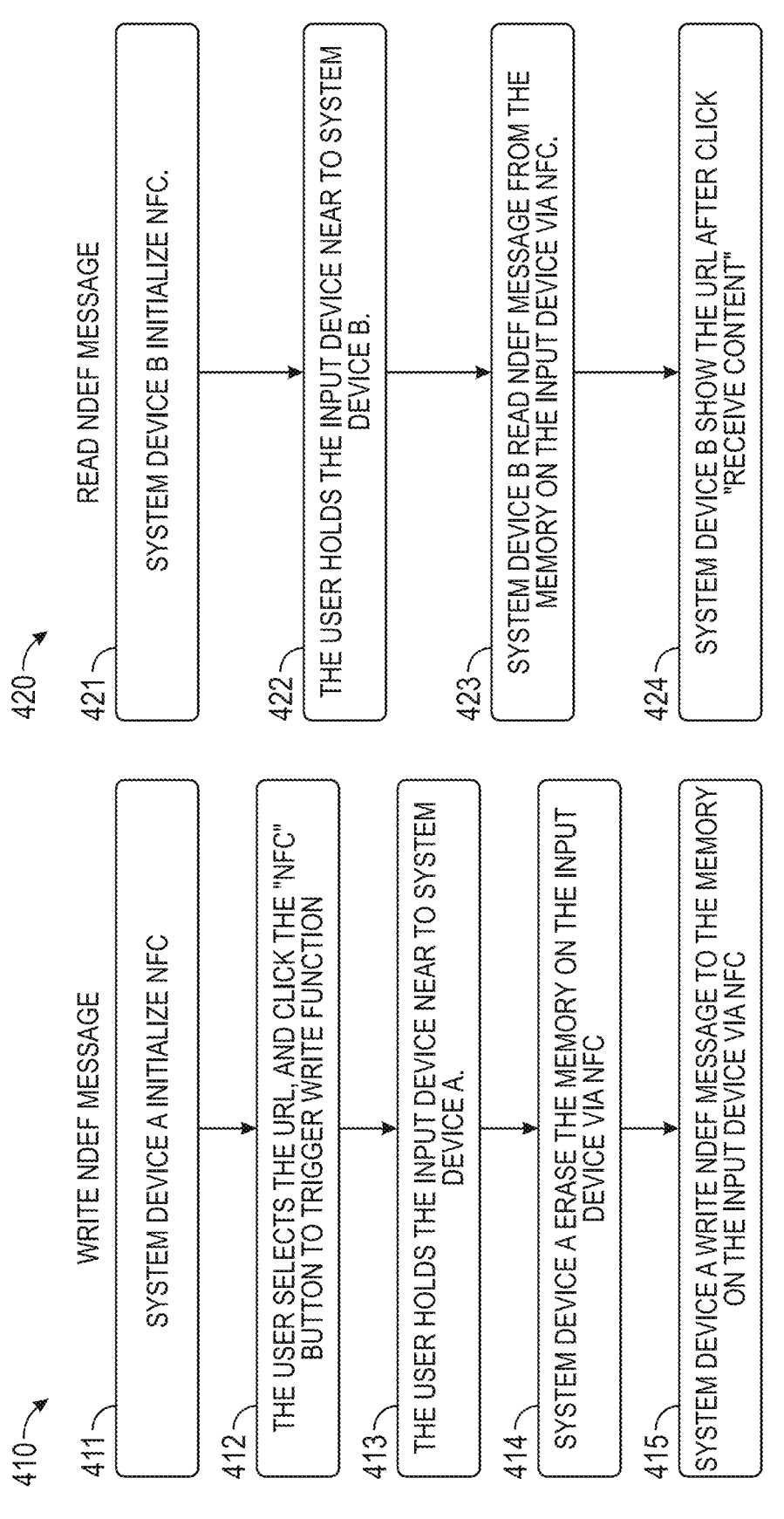

WRITE NDEF MESSAGE

410

411 — SYSTEM DEVICE A INITIALIZE NFC

412 — THE USER SELECTS THE URL, AND CLICK THE "NFC" BUTTON TO TRIGGER WRITE FUNCTION

413 — THE USER HOLDS THE INPUT DEVICE NEAR TO SYSTEM DEVICE A.

414 — SYSTEM DEVICE A ERASE THE MEMORY ON THE INPUT DEVICE VIA NFC

415 — SYSTEM DEVICE A WRITE NDEF MESSAGE TO THE MEMORY ON THE INPUT DEVICE VIA NFC

READ NDEF MESSAGE

420

421 — SYSTEM DEVICE B INITIALIZE NFC.

422 — THE USER HOLDS THE INPUT DEVICE NEAR TO SYSTEM DEVICE B.

423 — SYSTEM DEVICE B READ NDEF MESSAGE FROM THE MEMORY ON THE INPUT DEVICE VIA NFC.

424 — SYSTEM DEVICE B SHOW THE URL AFTER CLICK "RECEIVE CONTENT"

DATA ITEM SHARING VIA POINTING DEVICE

FIELD

This disclosure relates generally to Information Handling Systems (IHSs), and more specifically, to systems and methods for sharing data items via pointing devices.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

According to one embodiment, a method includes: communicating, by a pointing device, with a first information handling system (IHS) to control a cursor on a display screen of the first IHS; receiving a data item from the first IHS to memory of the pointing device; establishing a connection between the pointing device and a second IHS; and transferring the data item from the memory of the pointing device to the second IHS.

According to one embodiment, an Information Handling System (IHS), includes: a processor; and a memory coupled to the processor, the memory having program instructions stored thereon that, upon execution by the processor, cause the IHS to: control a cursor on a display screen of the IHS in response to signals communicated from a pointing device; receive an indication from a hardware trigger or a software trigger, wherein the hardware trigger or the software trigger is associated with the pointing device; and write a data item from the IHS to a memory of the pointing device in response to the hardware trigger or the software trigger.

According to one embodiment, a hardware memory device having program instructions stored thereon that, upon execution by a processor of an Information Handling System (IHS), cause the IHS to: establish a communication session between the IHS and a pointing device; read a data item to the IHS from a memory of the pointing device; prompt a user on a GUI of a display screen of the IHS to determine how to proceed with respect to the data item; and proceed according to user input in response to prompting the user.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 4 is an illustration of example methods, such as may be used to transfer a data item between Device A and Device B using near field communication (NFC) transfer, according to some embodiments.

FIG. 7 is an illustration of an example method, for transferring a file from Device A to Device B, according to some embodiments.

DETAILED DESCRIPTION

Figure 1:
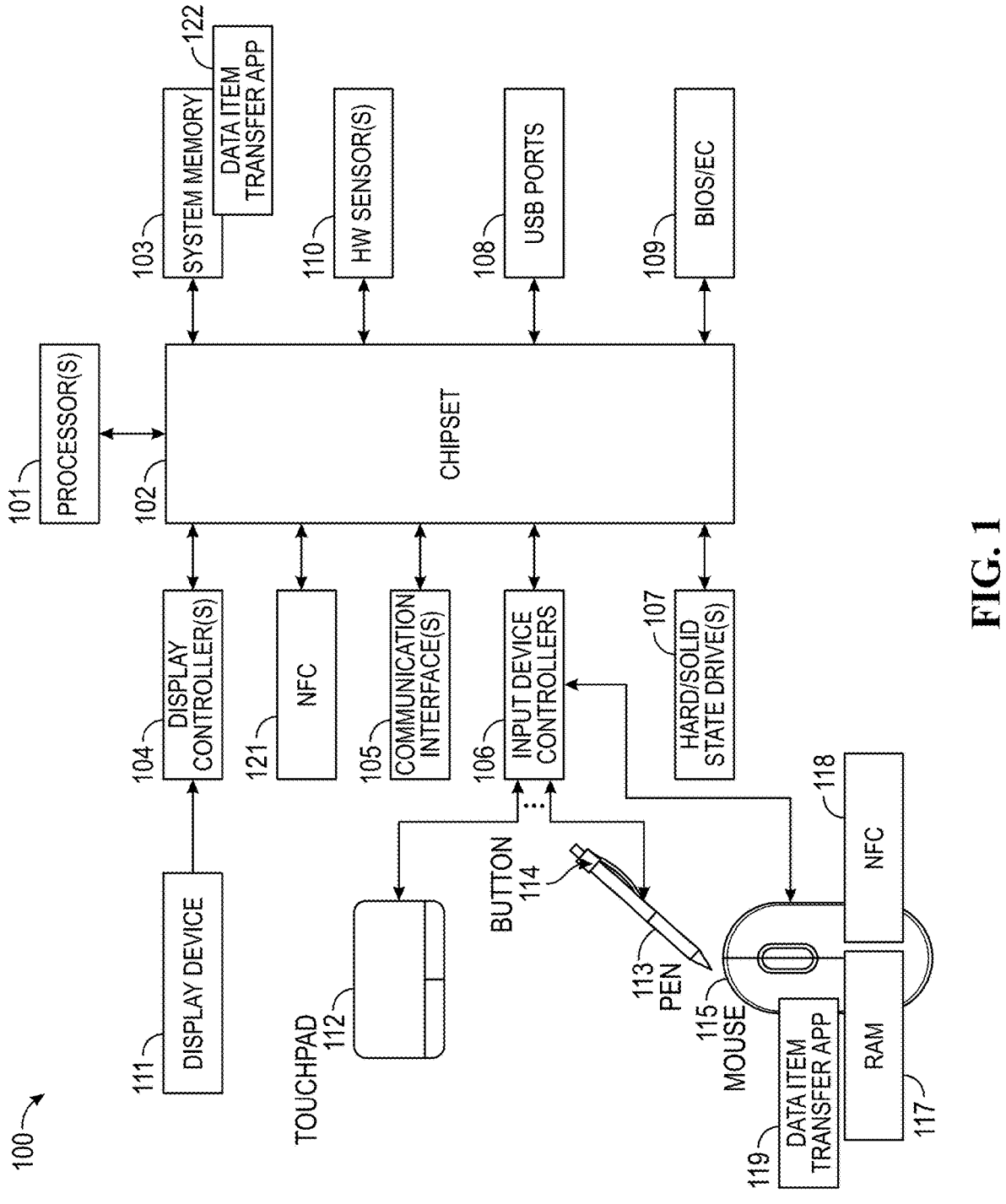
FIG. 1 is a block diagram of components of an example Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. It should be appreciated that although certain embodiments are discussed in the context of a personal computing device, other embodiments may utilize various other types of IHSs.

Various embodiments may include a pointing device, such as a mouse, active pen, trackball device, gaming control device, or the like, that includes functionality to transfer a data item from a first IHS to a second IHS.

In one example, a pointing device may include a near field communication (NFC) device physically incorporated into the pointing device, such as being included inside a housing of the pointing device, adhered to the housing of the pointing device, or the like. The NFC device may allow the pointing device to communicate with an NFC device of the first IHS. For instance, a user may place the pointing device onto a portion of the IHS, where that portion of the IHS includes another NFC device. The user may then employ a hardware trigger or software trigger to cause data to be transferred from the NFC device of the IHS to the NFC device of the pointing device. For instance, the NFC device of the pointing device may include memory to allow the data item to be stored to the NFC device of the pointing device.

Continuing with the example, the user may then physically move the pointing device to a second IHS, where the second IHS also has an NFC device. The user may place the pointing device onto a portion of the second IHS to allow the NFC device of the pointing device to communicate with the NFC device of the second IHS. The user may then use a hardware trigger or software trigger to cause the NFC device of the pointing device to transfer the data item to the NFC device of the second IHS.

Transfer of a data item from a first IHS to a second IHS, via an NFC device of the pointing device, may allow for transfer of relatively small data items, such as small files, uniform resource indicators (URIs), and the like. Of course, a given NFC device may be configured with any appropriate amount of memory and may be configured to transfer any appropriately sized data item, whether relatively large or relatively small.

In another example, the pointing device may include random access memory (RAM) built into the pointing device itself. For instance, the pointing device may include a circuit board onto which RAM may be implemented. The pointing device may also include a wireless chipset, which may allow the pointing device to communicate with the first IHS via some wireless protocol, such as Bluetooth. Once the pointing device has been paired with the first IHS, the pointing device and the first IHS may communicate wirelessly. The pointing device and the first IHS may include functionality to allow the first IHS to transfer a data item from the first IHS to the pointing device so that the first data item may be stored in the RAM of the pointing device. For instance, there may be a software or hardware trigger that causes the pointing device to read the data item from the first IHS and store that data item into the RAM of the pointing device.

Continuing with the example, the pointing device may also be paired with a second IHS. The second IHS may also include functionality to allow it to receive a data item from the pointing device. The user may then cause the pointing device to establish a communication session with the second IHS. The user may then use a software trigger or hardware trigger to cause the second IHS to read the data item from the RAM of the pointing device via a wireless protocol.

In this example, the RAM of the pointing device may be implemented to have any appropriate data capacity. For instance, the RAM may be sized in megabytes or gigabytes, thereby allowing for transfer of files that may be larger than would be expected to be transferred via an NFC device.

In yet another example, the pointing device may receive wireless communication credentials from the first IHS via an NFC device or other wireless communication. The user may then establish a communication session with a second IHS and transfer the wireless communication credentials of the first IHS to the second IHS. The second IHS may then coordinate with the first IHS to establish a communication session between the two IHSs. For instance, the first IHS and second IHS may establish a Bluetooth communication session, a Wi-Fi communication session or other appropriate communication session. The first IHS and the second IHS may then exchange files or other data items over that communication session.

In the various embodiments described herein, the pointing device may include a data item transfer application, and the various IHSs may also include corresponding data item transfer applications. The data item transfer applications may be adapted specifically for a quick and relatively simple transfer of a data item from an IHS to the pointing device and then from the pointing device to a different IHS.

Examples of data items that may be transferred may include, but are not limited to, files, user profile data, IHS settings, software lists, URIs, and the like.

Various embodiments may provide advantages over other systems. One potential advantage may include allowing a human user to transfer data items between IHSs without having to manually store a data item to a folder in a removable storage device (e.g., a flash drive), safely unplug the removable storage device from the first IHS, plug-in the removable storage device to a second IHS, and navigate folders in the removable storage device to access the data item at the second IHS. Rather, the user may instead employ a pointing device, first establishing a communication session with the first IHS and reading the data item from the first IHS, then establishing a communication session with the second IHS and writing the data item from the pointing device to the second IHS.

Another potential advantage may include the ability to seamlessly transfer IHS settings between IHSs by the pointing device. For instance, the data item transfer applications on the pointing device and the IHSs may have functionality specifically adapted for reading IHS settings from a first IHS, storing the IHS settings in one or more appropriate data structures, establishing a communication session with a second IHS, and transferring the IHS settings to the second IHS in the communication session. Current solutions only offer manual entry of IHS settings, thereby making it difficult for a human user to switch between IHSs.

The terms "touchpad," "trackpad," and "clickpad," as used herein, generally refer to a pointing device featuring a touch sensor having a specialized surface that translates motion and position detected thereon into a relative or absolute position usable by an Operating System (OS) of an IHS to render an image (e.g., an arrow, a cursor, etc.) on a display.

In various implementations, a touchpad may be a capacitive touchpad. A capacitive touchpad produces an electrostatic field that is disrupted when touched (e.g., by an object that draws some electrical charge). Particularly, a capacitive touchpad detects a reduction of its capacitance and uses that to determine when, where, and/or by how much (e.g., pressure) it is being touched. In some cases, a touchpad may also be capable of identifying hovering of an object (e.g., a finger or pen) above its surface, as well as a height of the hovering (e.g., a vertical distance between an object and the touchpad. Additionally, or alternately, a touchpad may include a digitizer under its (non-display or opaque) surface.

A mouse may include an electronic pointing device that detects user translational movement and turns the movement into a relative position and speed of a cursor on a display device. A trackball device may include a ball that is configured to be manipulated by a user (e.g., by a user's thumb or pointer finger), detects the manipulation, and turns the manipulation into a relative position and speed of a cursor on a display device. A mouse or trackball device may also include one or more buttons, which may be pressed to indicate selection or to cause a menu to render.

The terms "pen" or "stylus," as used herein, generally refer to a cylindrical object, conventionally used with touchscreen-enabled devices (e.g., tablet IHSs, to navigate a Graphical User Interface or "GUI," send messages, etc.), but which in various embodiments described herein may be further usable in conjunction with a touchpad as pointing device for handwriting and/or for drawing, for example, during a collaboration session using one or more writing or drawing tools (e.g., lines, brushes, sprays, patterns, colors, shapes, etc.).

A passive or capacitive pen is a pen that behaves like a human finger when touching a touchpad. In contrast, an active pen includes electronic components that communicate with the touchpad. Active pens may be used for, example, for note taking, on-screen drawing/painting, electronic document annotation, signatures, etc. In some cases, when either type of pen is used, the touchpad may enable or change its palm rejection settings or parameters to accommodate a user's hand holding the pen while responding only to pen inputs.

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BLUETOOTH, cellular or mobile networks (e.g., CDMA, TDMA, LTE, etc.), satellite networks, or the like. In some cases, communication interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controller or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, cause the IHS 100 to perform the functions associated with an application.

Chipset 102 may also provide access to one or more hard disk and/or solid-state drives 107. In certain embodiments, chipset 102 may also provide access to one or more optical drives or other removable-media drives. In certain embodiments, chipset 102 may also provide access to one or more Universal Serial Bus (USB) ports 108.

Chipset 102 may further provide access to input device controllers 106, for example, a super I/O controller, firmware or software functionality, or the like. Examples of user input devices which may be communicatively coupled to input device controllers 106 include, but are not limited to, a keyboard, mouse 115, touchpad 112, stylus or pen 113 (with button or switch 114), totem, etc. Input device controllers 106 may represent multiple controllers, such that each of the user input devices may correspond to a respective controller (e.g., touchpad 112 may have its own touchpad controller). Each of the input devices may interface with its respective controller 106 through a wired or wireless connection (e.g., via communication interfaces(s) 105).

Furthermore, in this example, mouse 115 includes RAM 117, NFC device 118, and computer-readable code that, when executed by a processing device (not shown) within mouse 115 provides the functionality of data item transfer application 119. IHS 100 includes NFC device 121, which may be configured to communicate with other NFC devices, such as NFC device 118. Additionally, system memory 103 includes computer-readable code that, when executed by the processors 101, provides the functionality of data items transfer application 122.

In one example, the data item transfer application 119 and the data item transfer application 122 may be configured to coordinate to allow for a data item from IHS 100 to be written to RAM 117 and/or NFC 118. The data item transfer application 119 may further be configured to allow it to coordinate with a data item transfer application of another IHS (not shown) to allow for the data item to be transferred from the RAM 117 and/or NFC 118 to the other IHS.

Each of the NFC devices 118, 121 may include a transceiver, a processor, and some amount of memory. Each of the NFC devices 118, 121 may or may not include a power source and, in some implementations, any of the NFC devices 118, 121 may harvest power from received radio frequency (RF) waves. In one example, NFC device 118 may include hardware or firmware functionality to allow it to receive a data item via NFC 121, store that data item in memory associated with the NFC device 118, communicate with another NFC device of another IHS (not shown) and transfer that data item to the other NFC device.

Furthermore, although only mouse 115 is shown as including a data item transfer application, RAM, and an NFC device, it is understood that other pointing devices, such as the pin 113, a trackball device (not shown), a gaming controller (not shown), and/or the like may be similarly equipped. In other words, while the examples herein may refer to a mouse specifically or a pointing device generally, it is understood that other pointing devices may be adapted for use in the same way to transfer data items from one IHS to another IHS.

In certain embodiments, chipset 102 may also provide an interface for communications with one or more hardware sensors 110. Sensors 110 may be disposed on or within the chassis of IHS 100, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. The BIOS provides an abstraction layer that allows the OS to interface with certain hardware components that are utilized by IHS 100. Via the hardware abstraction layer provided by the BIOS, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip. As such, in certain embodiments, IHS 100 may be implemented as different classes of computing devices including, but not limited to: servers, workstations, desktops, laptops, appliances, video game consoles, tablets, smartphones, etc.

Figure 2:
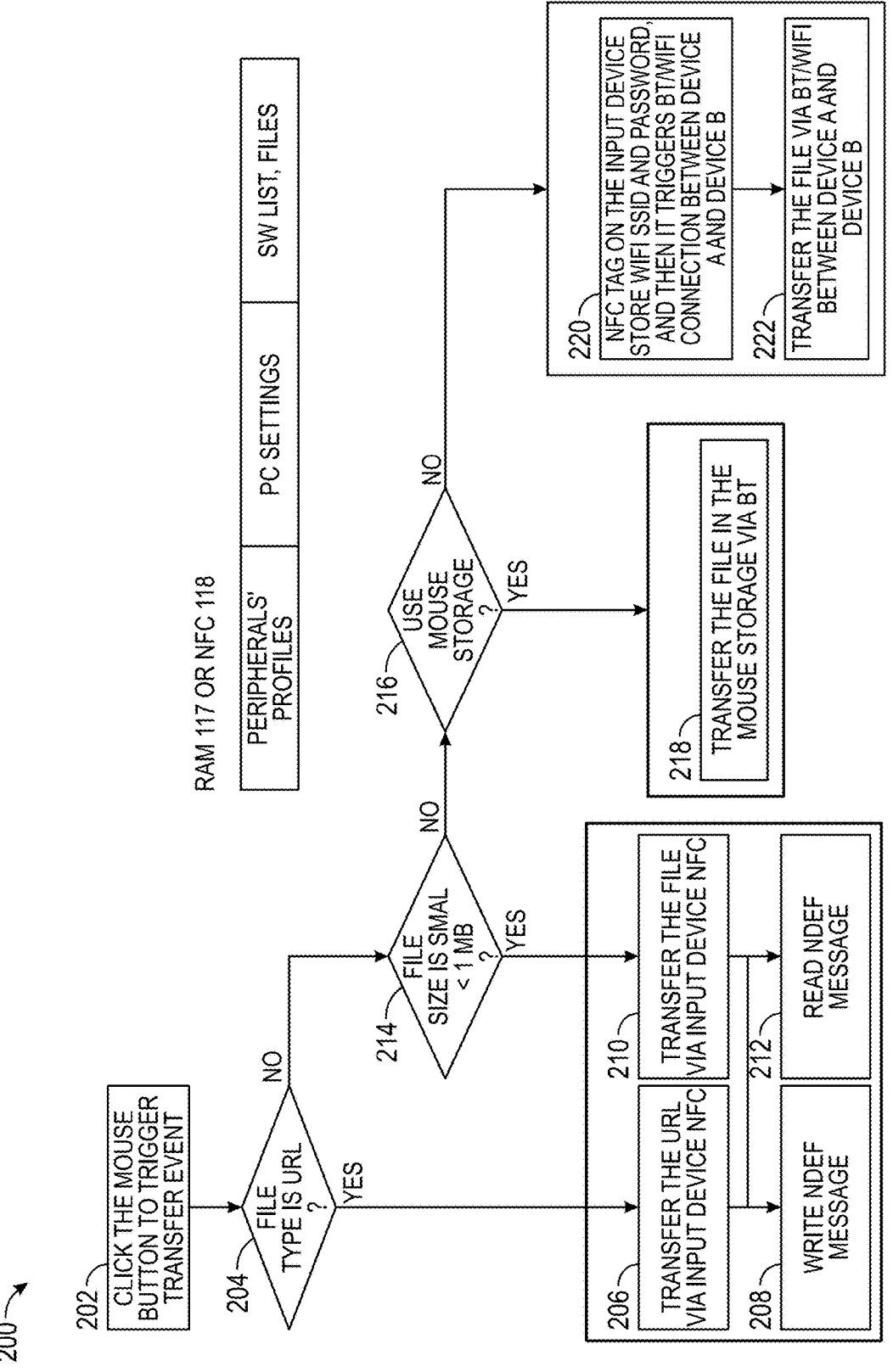
FIG. 2 is an illustration of an example method, which may be performed by a data item transfer application, such as either of the data item transfer applications of FIG. 1.

FIG. 2 is an illustration of method 200, which may be performed by a data item transfer application, such as either or both of applications 119 and 122. The responsibilities and functions of applications 119 and 122 may be distributed between applications 119 and 122 in any appropriate manner.

Figure 3:
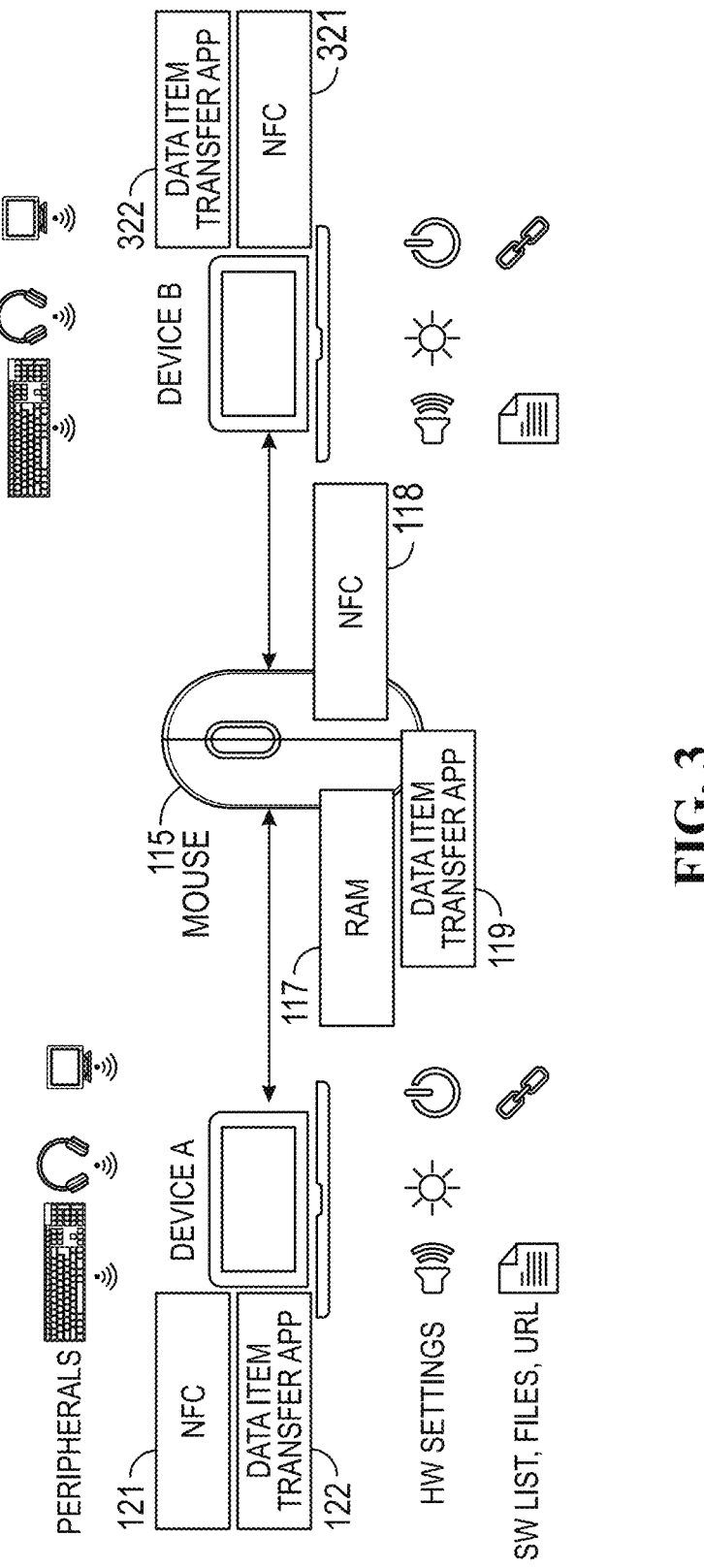
FIG. 3, which illustrates an example system, having example Device A and Device B, according to some embodiments.

The method 200 is described with respect to FIG. 3, which illustrates a system 300, having Device A and Device B. Each of Device A and Device B may be implemented similarly to 100 of FIG. 1. Device B may include application 322, which is the same as or similar to application 122, and may also include NFC device 321, which is the same as or similar to NFC device 121.

The method 200 begins with a pointing device, such as mouse 115, pen 113, or the like communicating with Device A (e.g., a first IHS) to control a cursor on a display screen (display device 111). Thus, the pointing device may be paired with Device A and may have a communication session with Device A. During the communication session a human user may make movements and gestures with the pointing device to control items, such as cursors, on a graphical user interface (GUI) on the display screen.

Continuing with the example, the user may determine to transfer a data item from Device A to Device B (e.g., a second IHS). The user may then employ a software trigger or hardware trigger to indicate which data item and to trigger a data item transfer event. For instance, in an example in which the user is interacting with a web browser, the user may select a URI and then trigger a copy of the URI by any appropriate technique. For instance, triggering the URI may be performed by left clicking the mouse and selecting an interactive item to copy the URI to the pointing device. In another example, the data item transfer application 122 may include functionality to render a software trigger on the GUI, allowing the human user to navigate a cursor on the GUI to the software trigger, selecting the software trigger, and causing the data item to be copied. Such techniques may be used to write the data item to RAM 117.

In another example, the user may instead cause the data item to be written to memory of the NFC device 118. For instance, the user may place the pointing device physically on a portion of the housing of Device A that is directly over or proximate the NFC device 121. Assuming the URI is already selected, then the application 122 may display a software trigger to allow the user to select the software trigger to cause the data transfer from NFC device 121 to NFC device 118. In another example, instead of using a software trigger, the pointing device may have a hardware trigger so that manipulation of the hardware trigger (e.g., clicking a button) may cause the transfer of the data item from NFC device 121 to NFC device 118.

In other words, while action 202 includes clicking the mouse button to trigger a transfer event, the transfer event may be triggered in any appropriate manner.

In some implementations, the user may place the pointing device near the NFC device 121 to allow for transfer of the data item by NFC. However, the placement of the pointing device may not preclude transfer by some other wireless protocol such as Bluetooth. In such implementations, the applications 119 and/or 122 may determine how to transfer the data item based on the type of data item or the size of the data item. Thus, a relatively small data item, such as a URI, may be transferred by NFC, as may any relatively small (less than 1 MB) data item. On the other hand, the applications 119 and/or 122 may be configured to use RAM 117 of the pointing device for transfer of data items that are greater than 1 MB. Of course, the scope of implementations may include any thresholds for size or instructions for data item type that are appropriate. For instance, the 1 MB threshold is for example, and it is understood that some implementations may have a threshold that is larger or smaller.

In other words, the applications 119 and/or 122 may make determinations at actions 204, 214, and 216 based on data item size and data item type. The different data items may include files (e.g., word processing files, spreadsheets, images), software lists (e.g., a list of all applications or selected applications on Device A), IHS settings (e.g., sound settings, display settings, pointing device settings, hotkey settings, power settings), profiles associated with user accounts and different peripherals, and the like. In fact, the scope of implementations is not limited to any particular data item, as any appropriate data item may be transferred in some implementations.

In the present example, when it is determined at action 204 that the data item is a URI, then the applications 119, 122 may be configured to transfer the data item by NFC at action 206. Similarly, when it is determined that action 214 that the data item is smaller than 1 MB, the applications 119, 122 may be configured to transfer the data item by NFC as well at action 210. Transfer by NFC may include writing the data item in an NFC data exchange format (NDEF) message from NFC device 121 to NFC device 118 at action 208. The NFC device 118 may include internal memory, thereby allowing the NFC device 118 to store the data item. Transferring the data item to the second IHS (Device B) may include physically positioning the pointing device so that NFC device 118 is within operating distance of NFC device 321 of Device B so that Device B may use NFC device 321 to read the data item as an NDEF message at action 212. Once Device B reads the data item as an NDEF message, Device B may process the data item as appropriate.

Figures 5, 6:
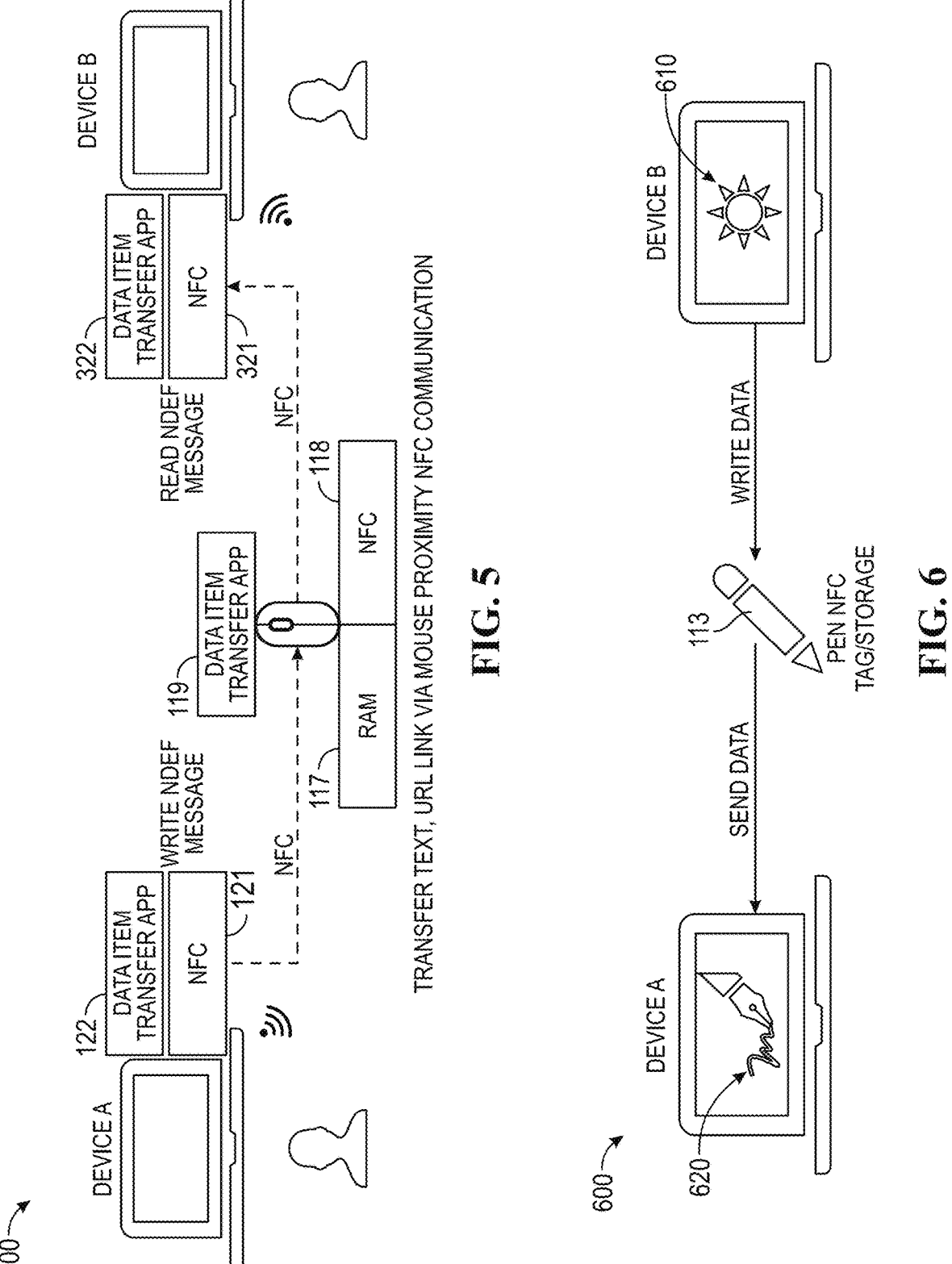
FIG. 5 is an illustration of an example method, in which data transfer may be performed according to the methods of FIG. 4, according to some embodiments.
FIG. 6 is an illustration of an example method, in which a data item may be transferred using a pen device, according to some embodiments.

Transfer by NFC device is described in more detail with respect to FIGS. 4 and 5.

In another example, the actions 204-216 may determine that the data item transfer is appropriate to perform using a technique other than NFC transfer. For instance, once NFC transfer of the data item has been ruled out at determinations 204, 214, then the applications 119, 122 may be configured at action 216 to determine whether to use RAM 117 for the data item itself or to use the pointing device to transfer wireless network credentials to allow the IHSs to set up a wireless communication and transfer the data item.

For instance, action 216 may include determining to transfer the data item using RAM 117 at action 218. Action 216 may instead include determining to transfer wireless network credentials between the IHSs using either RAM 117 or NFC device 118 at actions 220-222. For instance, action 220 may include using NFC device 118 or RAM 117 to copy a wireless credential of IHS 100 and then to transfer that wireless credential to Device B. Device B may then be triggered to set up a wireless communication session (e.g., Bluetooth or Wi-Fi) with Device A, and then Device A may transfer the data item to Device B over the communication session.

FIG. 4 is an illustration of example methods 410 and 420, such as may be used to transfer a data item between Device A and Device B using NFC transfer, according to some embodiments. FIG. 5 is an illustration of method 500, in which data transfer may be performed according to methods 410 and 420, according to some embodiments.

Method 410 is an example method for writing a data item from Device A to NFC device 118 of the pointing device, according to some embodiments. For instance, method 410 may be used to implement actions 206, 208, and 210 as well as action 220 of FIG. 2. Action 420 may be performed through cooperation between data item transfer application 119 and data item transfer application 122.

At action 411, Device A initializes its NFC device (e.g., NFC device 121). The user uses a pointing device (e.g., mouse 115) to control a cursor or other item on a GUI of the display screen. For instance, the user may be interacting with a web browser and may select the URI at action 412. In this example, action 412 may also include the application 122 rendering a software trigger as an "NFC" button, to trigger a transfer of the URI to the NFC device 118.

At action 413, the user holds the pointing device within an operating distance of the NFC device 121 of Device A. At action 414, the Device A may be in NFC communication with NFC device 118 of the pointing device and may cause the memory of the NFC device 118 to be erased. At action 415, the NFC device 121 of Device A writes the data item to the memory of the NFC device 118 as an NDEF message. The NFC device 118 stores the NDEF message in its own memory.

Method 420 is an example method for reading a data item from NFC device 118 of the pointing device to Device B, according to some embodiments. For instance, method 420 may be used to implement actions 212 and 222 of FIG. 2. In this example, method 420 follows the completion of method 410, so that the data item is stored to the NFC device 118 of the pointing device. Method 420 may be performed through cooperation of data item transfer application 119 and data item transfer application 322.

At action 421, Device B initializes its NFC device 321. At action 422, the user holds the pointing device within an operating distance of the NFC device 321 of Device B. At action 423, the NFC device 321 reads the data item as an NDEF message from the memory on the NFC device 118. The Device B may then parse the NDEF message and process the contents of the NDEF message as appropriate. In one example, Device B may then provide a prompt to the user to allow the user to put the URI from the message into a web browser and cause the web browser to go to that address.

Of course, the scope of implementations is not limited to transferring a URI. For instance, methods 410 and 420 may be performed with respect to other data items, such as files, settings, and the like. An example in which the data item is a file, then Device B may provide a prompt to allow the user to cause the file to be opened. In an example in which the data item includes settings, the Device B may provide a prompt to allow the user to apply some or all of those settings to Device B and/or its peripherals.

In one example of method 410, 420 and FIG. 5, a user may be using a conferencing application on Device A and then choose to add a device to join the ongoing call. In this example, the user may use a pointing device having NFC device 118 to copy a link associated with the ongoing call, move to Device B, and cause Device B to read the link from the NFC device 118. The Device B may provide a prompt for the user to choose to launch the conferencing application and join the call, which the user may choose or not.

FIG. 6 is an illustration of example method 600, in which a data item may be transferred using pen device 113, according to some embodiments. In the example of system 600, the pen device 113 may transfer a data item from Device B to Device A. Further in this example, the pen device 113 may be equipped similarly to the mouse 115 of FIG. 1, so that the pen device 113 may include application 119, RAM 117, and NFC device 118.

The user may have a drawing application open on Device B, including using pen 113 to draw an image 610 on the GUI of the drawing application on Device B. The user may then desire to transfer text, color, and/or the image 610 from Device B to Device A. The user may use pen device 113 to transfer text, color, and/or the image 610, just as the user would have used another pointing device, such as mouse 115 in the other examples.

Continuing with the example, the user may prompt the pen device 113 to communicate via NFC with Device B to copy the desired data item. The user may then physically move the pen device 113 to within an NFC operating range of Device A and then prompt Device A to read the data item. Device A may then process the data item as appropriate, such as providing a prompt to the user to allow for the transfer of text, color, and/or the image 610. In the example of FIG. 6, the user has chosen to transfer a color, which may come over as a file or as a red green blue (RGB) code. The user may then draw an image 620 using the same color as for image 610. Furthermore, the user may use pen device 113 on Device A or use another pointing device once the data item transfer is complete.

In an example in which the data item is larger and is unfit for transfer via NFC, then method 600 may include using another kind of data transfer, such as by transferring using RAM 117 (e.g., actions 216 and 218 of FIG. 2).

Figure 7:
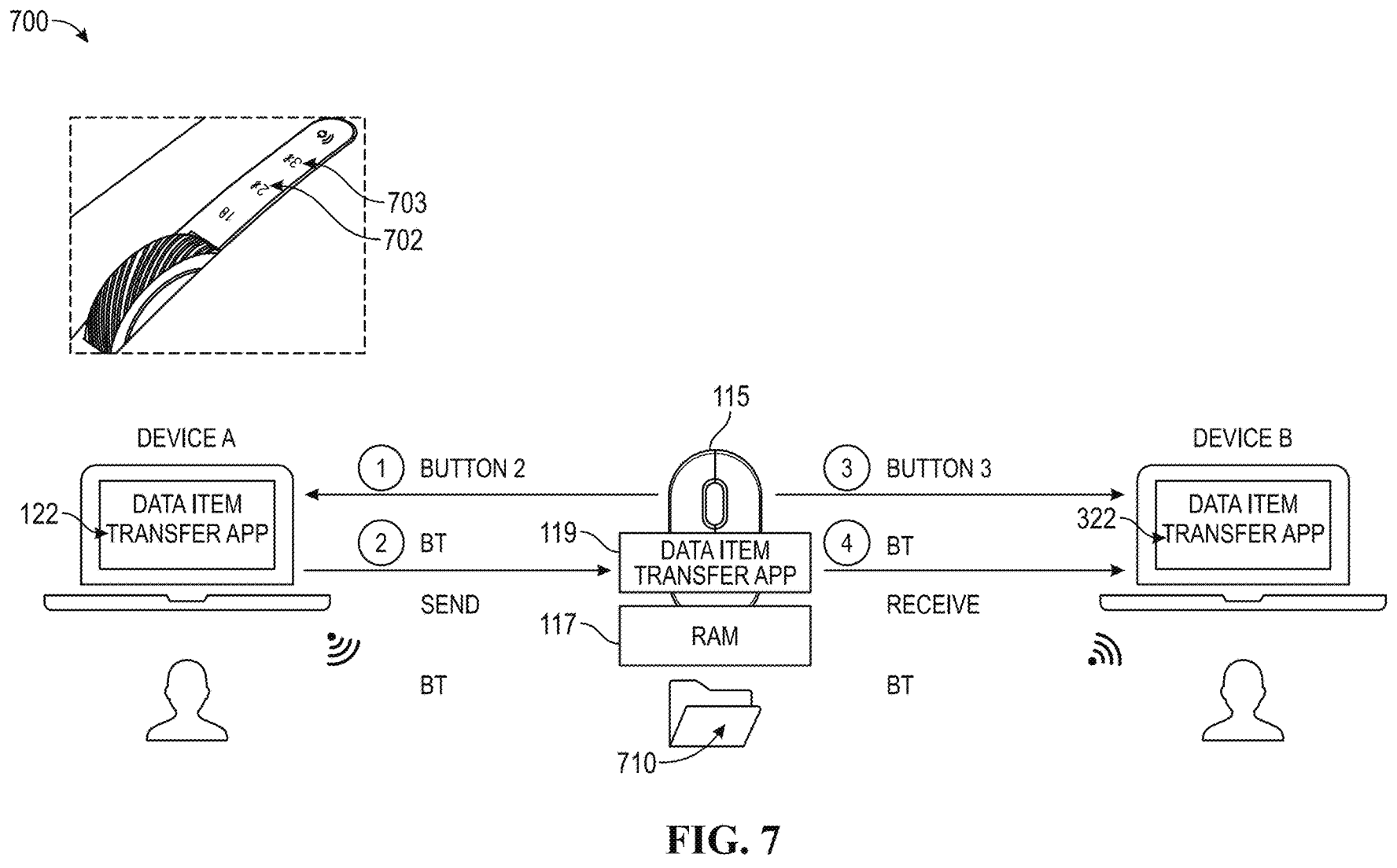

FIG. 7 is an illustration of example method 700, for transferring a file 710 from Device A to Device B, according to some embodiments. Device A may transfer file 710 to RAM 117, and then Device B may read the file 710 from RAM 117. The transfer may use a wireless protocol, such as Bluetooth to transfer from Device A to RAM 117 and from RAM 117 to Device B.

The actions of method 700 may be performed by coordination between data item transfer application 122 and data item transfer application 119 as well as coordination between data item transfer application 119 and data item transfer application 322.

To begin, the pointing device (e.g., mouse 115) may be paired to Device A and to Device B by Bluetooth. In this example, pairing may include device recognition as well as a shared secret, which allows paired devices to communicate by encryption using the shared secret. A communication session may use the encryption. When the user presses or otherwise selects the button 702, that may instruct the mouse 115 to establish a communication session with Device A. Similarly, when the user presses or otherwise selects the button 703, that may instruct the mouse 115 to establish a communication session with Device B.

The user may select button 702, thereby establishing a communication session with Device A. The user may select the file 710 to be transferred and then use a hardware trigger or software trigger to cause the file 710 to be transmitted over a Bluetooth connection from the Device A to the mouse 115. The transfer may be managed by applications 122 and 119. Application 119 may cause the data item (file 710) to be written to RAM 117.

The user may then select button 703, thereby establishing a communication session with Device B. The applications 119, 322 may then cooperate to transfer file 710 from RAM 117 to Device B. The transfer may be managed by coordination between applications 119, 322. Once Device B has read file 710 from RAM 117, the Device B may present a prompt to the human user regarding how to proceed. For instance, the prompt may allow the human user to select an application to use to open file 710, may provide an option for the user to store file 710, and/or the like.

Figure 8:
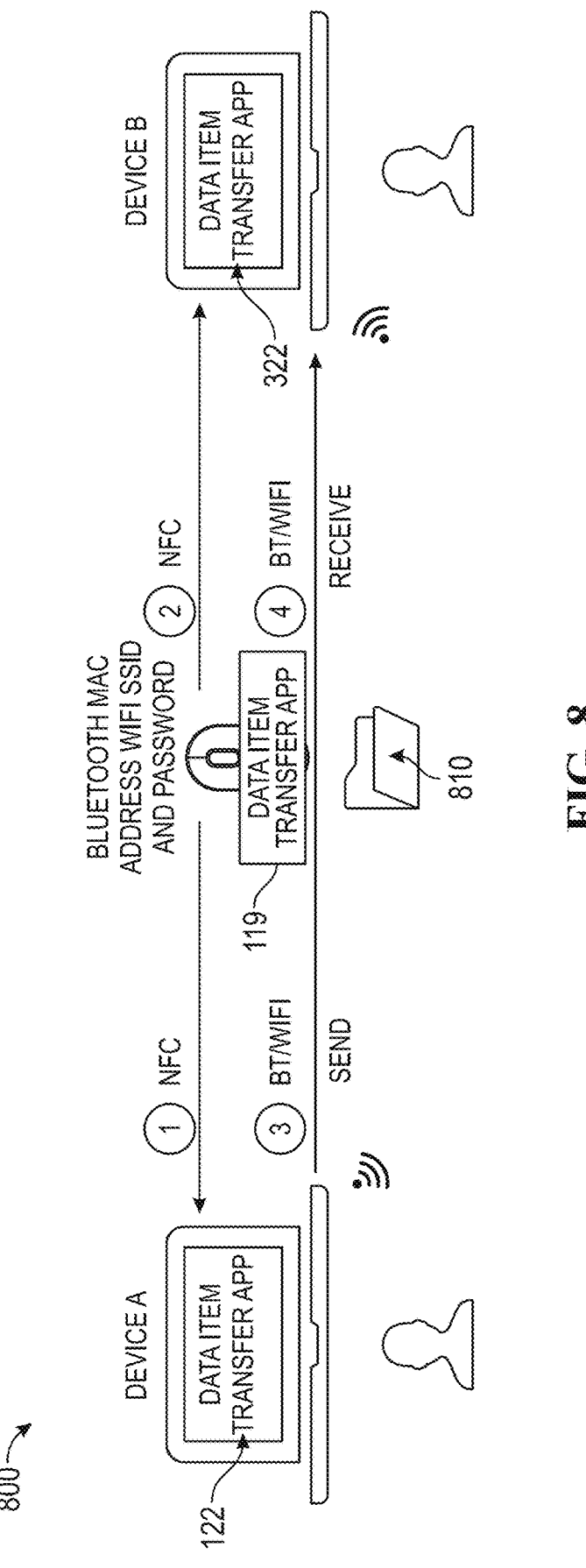
FIG. 8 is an illustration of an example method, to a transfer a data item between Device A and Device B, according to some embodiments.

FIG. 8 is an illustration of an example method 800, to transfer a data item (e.g., file 810) between Device A and Device B, according to some embodiments. Method 800 presents an example of actions 216, 220, and 222 of FIG. 2. Method 800 may be performed by coordination between application 122 and application 119 as well as coordination between application 119 and application 322.

As noted above, the data item transfer of actions 220 and 222 may include transferring wireless network credentials from Device A to Device B. In other words, the wireless network credentials in some aspects, are a data item that may be transferred. The method 800 may further include another data item, perhaps a larger data item such as file 810, which may be transferred after a communication session is established using the wireless network credentials.

The data item transfer of method 800 may include writing wireless network credentials of Device A to NFC device 118 of the pointing device. This may be performed, such as by using method 410 of FIG. 4 or method 700 of FIG. 7. The data item transfer application 122 and data item transfer application 119 may coordinate to ensure that the correct wireless network credentials are transferred. In this example, the wireless network credentials may include a Wi-Fi SSID and password of Device A and/or a Bluetooth address of Device A.

At this point, the NFC 118 stores the wireless network credentials of Device A. The user may then cause Device B to read the wireless network credentials from the NFC device 118. For instance, this may be performed by using method 420 of FIG. 4. The applications 119, 322 may coordinate to ensure that the correct wireless network credentials are read from NFC device 118 to Device B. Once Device B has read the wireless network credentials, then Device B may proceed in any appropriate manner. For instance, Device B may present a prompt on its GUI to allow the user to choose how to proceed. In one example, the prompt may allow a user to select to create a communication session between Device A and Device B. Assuming the user chooses that option, then Device A and Device B may then set up a communication session using the wireless network credentials. The communication session may be via Wi-Fi, Bluetooth, or other appropriate communication protocol.

Furthermore, the applications 122 and 322 may coordinate to transfer the correct file. In one example, the file 810 may be indicated (e.g., by path identification or file name) in the transfer from Device A to NFC 118 to Device B. In another example, application 122 may store an indication of the file 810 to be transferred, and once the communication session is established with Device B, application 122 and application 322 may coordinate to transfer the file 810.

Thus, the data transfer techniques discussed herein may allow for ease of use by a human user in various use cases. An example use case, a user may have access to multiple different IHSs. Example scenarios in which a user may have access to multiple different IHSs may include a user who has a home office setup with multiple laptops, a user having a designated office space at a business and having access to multiple IHSs, a user visiting another location and using a shared computer, a user un-boxing a new IHS while still having access to an old IHS, and/or the like.

The examples described above may allow the user to transfer data, system hardware settings, software settings, peripheral settings, power settings, and/or the like, via the pointing device. For instance, the user may be working at a first IHS and may use any of the techniques described above to copy software settings, hardware settings, power settings, and peripheral settings from the first IHS to a second IHS. As noted above, the user may employ the pointing device to transfer the data from the first IHS to the second IHS. Such transfer may be simple for the user, especially in a scenario in which the applications 119, 122, and 322 have been configured to coordinate to make the transfer possible and seamless.

In one example, a user may require accessibility adaptations, such as for a peripheral or a color display. Various embodiments may allow for ease of transfer for the user, thereby facilitating accessibility adaptations. The user may use a pointing device, such as described above, to store settings that correspond to the accessibility adaptations. For instance, the pointing device may be equipped such as discussed above with respect to mouse 115. When the user uses a different computer than the user's usual computer, the user may pair the pointing device to the different computer and then transfer the settings to the different computer. The user may use any of the techniques discussed above, such as at FIG. 2 and elsewhere, to transfer the settings as one or more data items to the different computer. The different computer may be equipped with a data item transfer application, such as application 322, that is configured to read the data item from the pointing device and then prompt the user as to how to proceed. For instance, the application 322 may be configured to recognize the data item as system settings and then prompt the user to apply one or more of those system settings to the different computer.

In another example, the user may transfer various settings from an old IHS to a new IHS during set up of the new IHS. In yet another example, the user may transfer a video conference session or other call session from one device to another device by, e.g., copying a URI and then transferring the URI to a different IHS.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method comprising:
communicating, by a pointing device, with a first information handling system (IHS) to control a cursor on a display screen of the first IHS;
receiving a data item from the first IHS to memory of the pointing device, including:
determining a data item type of the data item; and
selecting the memory of the pointing device, from a plurality of memory options, based on determining the data item type, including selecting between near field communication (NFC) device memory of the pointing device and a nonvolatile memory of the pointing device, wherein the NFC device memory has a smaller data capacity than does the nonvolatile memory of the pointing device;
establishing a connection between the pointing device and a second IHS; and
transferring the data item from the memory of the pointing device to the second IHS.

2. The method of claim 1, wherein the pointing device comprises a mouse device.

3. The method of claim 1, wherein the pointing device comprises an active pen device.

4. The method of claim 1, wherein the pointing device comprises a gaming control device.

5. The method of claim 1, wherein receiving the data item from the first IHS comprises:
receiving the data item to a near field communication (NFC) device of the pointing device, wherein the data item is formatted according to NFC data exchange format (NDEF).

6. The method of claim 1, wherein receiving the data item comprises receiving the data item as a hardware setting or software setting in use by the first IHS.

7. The method of claim 1, wherein receiving the data item comprises receiving a file or a uniform resource identifier (URI).

8. The method of claim 1, wherein receiving the data item comprises receiving a wireless network credential of the first IHS.

9. The method of claim 8, wherein transferring the data item includes causing the second IHS and the first IHS to establish a communication session using the wireless network credential of the first IHS.

10. The method of claim 1, wherein transferring the data item from the memory of the pointing device to the second IHS comprises:

transferring the data item by near field communication (NFC).

11. The method of claim 1, wherein transferring the data item from the memory of the pointing device to the second IHS comprises:

transferring the data item by Bluetooth connection.

12. A pointing device comprising:

a processor; and a first memory coupled to the processor, the memory having program instructions stored thereon that, upon execution by the processor, cause the pointing device to:

communicate, by the pointing device, with a first information handling system (IHS) to control a cursor on a display screen of the first IHS;

receive a data item from the first IHS to memory of the pointing device; including:

determine a data item type of the data item; and select a second memory of the pointing device, from a plurality of memory options, based on determining the data item type, including selecting between near field communication (NFC) device memory of the pointing device and a nonvolatile memory of the pointing device, wherein the NFC device memory has a smaller data capacity than does the nonvolatile memory of the pointing device;

establish a connection between the pointing device and a second IHS; and transfer the data item from the second memory of the pointing device to the second IHS.

13. The pointing device of claim 12, wherein the pointing device comprises a mouse device.

14. The pointing device of claim 12, wherein the pointing device comprises an active pen device.

15. The pointing device of claim 12, wherein the pointing device comprises a gaming control device.

16. The pointing device of claim 12, wherein the program instructions to cause the pointing device to receive the data item from the first IHS comprises program instructions to cause the pointing device to:

receive the data item to a near field communication (NFC) device of the pointing device, wherein the data item is formatted according to NFC data exchange format (NDEF).

17. The pointing device of claim 12, wherein the program instructions to cause the pointing device to receive the data item from the first IHS comprises program instructions to cause the pointing device to:

receive the data item as a hardware setting or software setting in use by the first IHS.

18. The pointing device of claim 12, wherein the program instructions to cause the pointing device to receive the data item from the first IHS comprises program instructions to cause the pointing device to:

receive a file or a uniform resource identifier (URI).

19. The pointing device of claim 12, wherein the program instructions to cause the pointing device to receive the data item from the first IHS comprises program instructions to cause the pointing device to:

receive a wireless network credential of the first IHS.

20. A hardware memory device having program instructions stored thereon that, upon execution by a processor of a pointing device, cause the pointing device to:

communicate, by the pointing device, with a first information handling system (IHS) to control a cursor on a display screen of the first IHS;

receive a data item from the first IHS to memory of the pointing device, including:

determine a data item type of the data item; and select a second memory of the pointing device, from a plurality of memory options, based on determining the data item type, including selecting between near field communication (NFC) device memory of the pointing device and a nonvolatile memory of the pointing device, wherein the NFC device memory has a smaller data capacity than does the nonvolatile memory of the pointing device;

establish a connection between the pointing device and a second IHS; and transfer the data item from the second memory of the pointing device to the second IHS.

* * * * *